(No Model.) 2 Sheets—Sheet 2.
J. L. BROEKELMANN & J. F. BUCKLER.
FISH TRAP.
No. 563,356. Patented July 7, 1896.
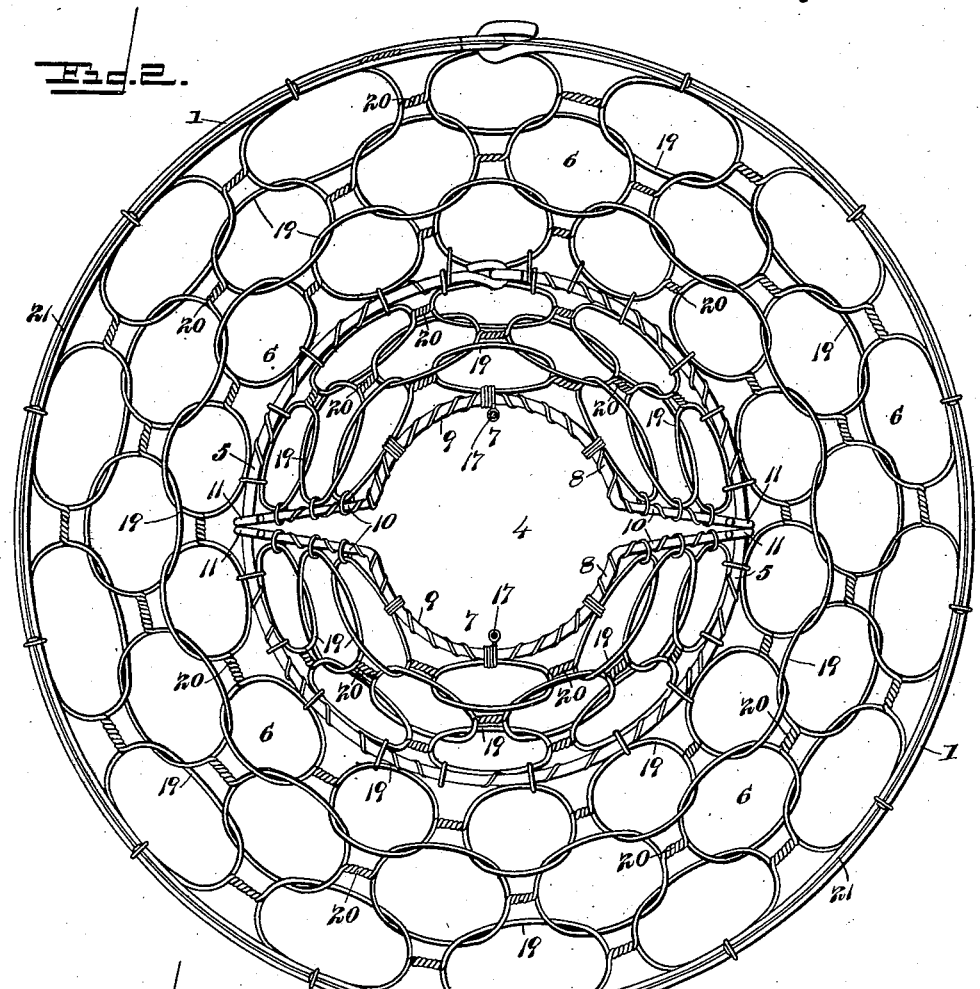
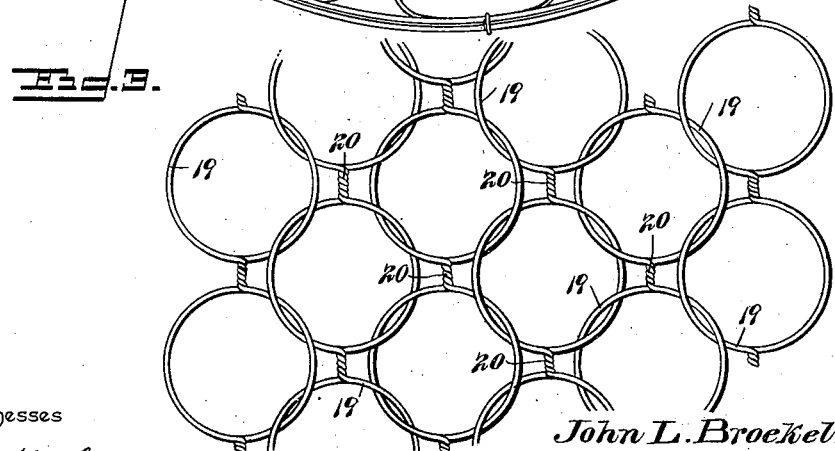
Witnesses
E. K. Stewart
Inventors
John L. Broekelmann
John F. Buckler
By their Attorneys,
C. A. Snow & Co.

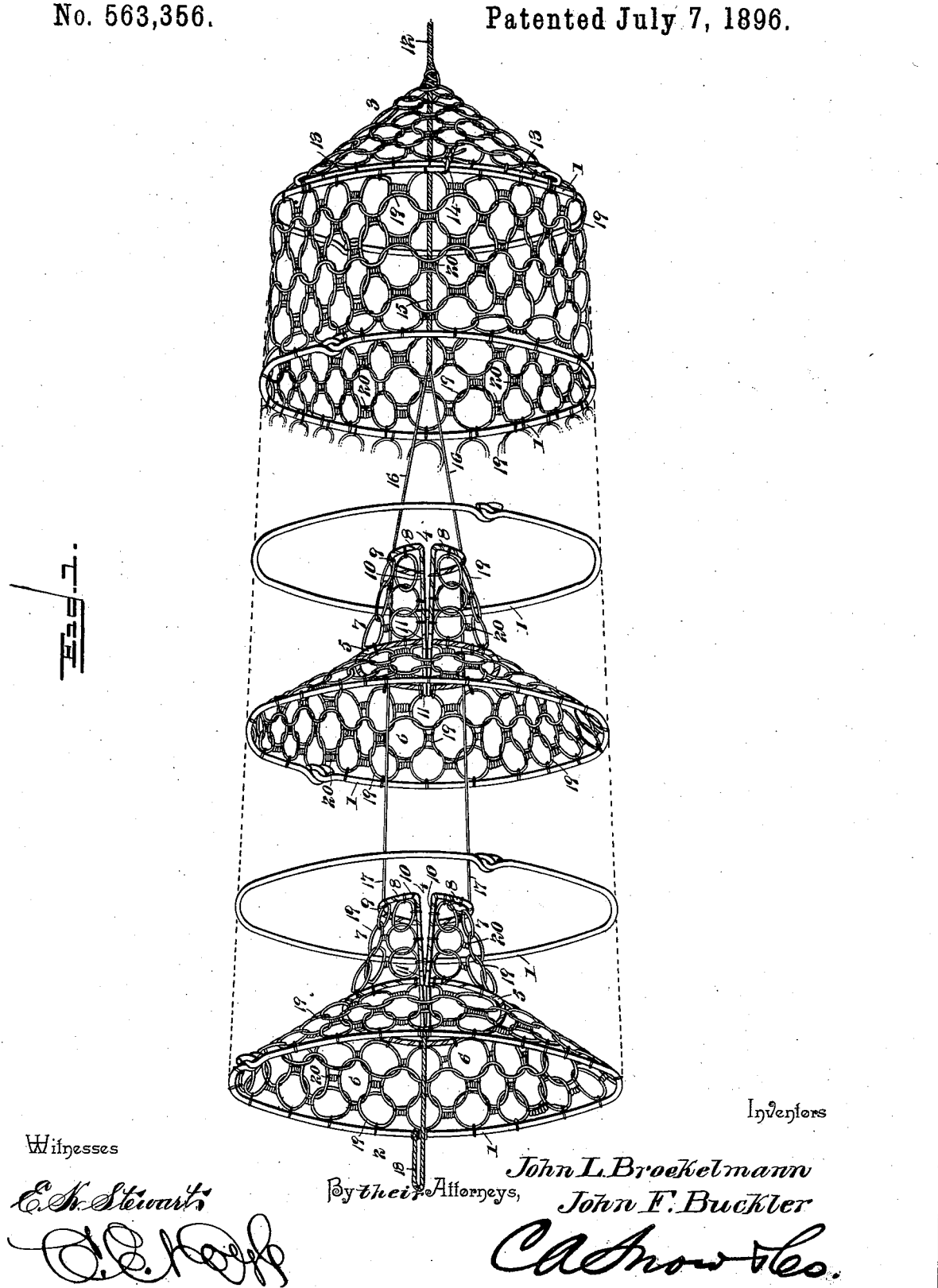

UNITED STATES PATENT OFFICE.

JOHN L. BROEKELMANN AND JOHN F. BUCKLER, OF FORT MADISON, IOWA.

FISH-TRAP.

SPECIFICATION forming part of Letters Patent No. 563,356, dated July 7, 1896.

Application filed December 23, 1895. Serial No. 573,095. (No model.)

*To all whom it may concern:*

Be it known that we, JOHN L. BROEKELMANN and JOHN F. BUCKLER, citizens of the United States, residing at Fort Madison, in the county of Lee and State of Iowa, have invented a new and useful Fish-Trap, of which the following is a specification.

Our invention relates to fish-traps, and has for its object to provide a simple, comparatively inexpensive, and efficient device adapted to receive and prevent the escape of game, and provided with means whereby the same may be removed with facility, the entire structure being adapted to fold into compact form for transportation.

Further objects and advantages of this invention will appear in the following description and the novel features thereof will be particularly pointed out in the appended claims.

In the drawings, Figure 1 is a perspective view of a trap constructed in accordance with our invention, the netting being omitted to show the interior construction. Fig. 2 is a transverse section. Fig. 3 is a detail plan view of a portion of the netting.

Similar numerals of reference indicate corresponding parts in all the figures of the drawings.

The trap is provided with a folding or collapsible frame consisting of a series of frame-rings 1 of graduated sizes, the diameters of the rings diminishing regularly in size from the inlet end 2 to the outlet end 3 of the structure. These frame-rings are connected by netting preferably constructed of copper wire, the links being loosely connected to allow the collapsing of the frame, as hereinafter more fully described.

Arranged at intervals within the trap are throats 4, each formed of a ring 5 of smaller diameter than the frame-rings, and connected to the latter by partitions 6, of netting, said partitions being of trunco-conical shape, and hinged jaws 7, mounted upon said ring 5 and consisting of frame-wires 8, also covered with netting. These frame-wires have oppositely-curved free ends 9 and forwardly-divergent side arms 10, which are connected by means of loops or eyes 11 with the throat-ring 5, whereby game entering through the front end of the trap and passing rearwardly between the jaws of a throat cause the spreading or deflection of the jaws, which offer but slight resistance.

The conical rear end of the trap is provided at its apex with a securing-loop or extension 12, and a portion of the covering of said conical end is carried by a swinging frame-rod 13, mounted upon the contiguous frame-ring and adapted, when released, to give access to the interior of the trap to remove game. The collapsible or flexible construction of the covering allows the movement of this pivotal frame-bar without any complexity of arrangement, and the frame-bar may be held in position to close the door by any suitable means, such as a tie 14. (Shown in the drawings.)

Extending axially through the trap from the apex of the rear end and attached to the extension or securing-loop is a tension-wire 15, the front extremity thereof being bifurcated to form the forwardly-divergent arms or extensions 16, which are attached, respectively, to the free ends of the jaws forming the movable part of the throat next to the rear end of the trap. The jaws of said throat are connected to the corresponding jaws of the next throat toward the front end of the trap by means of tension-wires 17, and in the same way any desired number of jaws may be connected in series to insure the proper extension of the trap and hold the parts thereof in operative positions. A securing loop or cable 18 is arranged at the inlet end of the trap, its extremities being connected to diametrically opposite points of the frame-ring at said inlet end.

The netting which we prefer to employ in connection with our improved trap consists of transverse series of connected approximately-circular links or meshes 19, the several links or meshes in each transverse series being integral and connected by an interposed twisted portion 20. Each transverse series or string of links or meshes is connected with the contiguous series or strings of links or meshes upon opposite sides thereof by interlocking each link or mesh of the first-named series with two links or meshes of each of the last-named series. Thus, while having considerable lateral stiffness by reason of the integral construction of the links or meshes forming a series or string, the interlocking or loose connection of the series or strings provides longitudinal looseness or collapsibility which materially facilitates the folding of the trap when not in use. The netting may be secured to the frame-rings in any suitable manner, such as by running wires 21 engaging the netting at intervals and extending parallel with and close to the rings.

Various changes in the form, proportion, and the minor details of construction may be resorted to without departing from the spirit or sacrificing any of the advantages of this invention.

Having described our invention, what we claim is—

1. A fish-trap having a series of alined or coaxial frame-rings connected in series by a flexible longitudinally-collapsible cover consisting of interlocking loosely-connected links or meshes, capable of relative sliding movement parallel with the longitudinal center of the trap, and means for preventing egress, substantially as specified.

2. A fish-trap having a series of alined frame-rings connected by a flexible cover consisting of netting comprising series of connected links or meshes arranged parallel with the frame-rings, the links or meshes of each series having interlocking connection with the links or meshes of the contiguous series whereby the netting may be collapsed longitudinally, substantially as specified.

3. A fish-trap having a series of alined frame-rings connected by a flexible cover consisting of wire-netting, said wire-netting being constructed of circumferential series of approximately circular links or meshes connected by integral interposed twisted portions, the links or meshes of each series having interlocking connection with the links or meshes of the contiguous series upon opposite sides thereof to allow longitudinal collapsibility, substantially as specified.

4. A fish-trap having a series of alined frame-rings connected by a flexible cover, throats arranged at intervals and having rearwardly-extending swinging jaws, and a longitudinal tension device connecting the jaws of the several throats in series and attached at the rear end of the trap to a securing-loop or extension, substantially as specified.

5. A fish-trap having a longitudinally-collapsible frame, and a longitudinally-collapsible covering of wire-netting supported by said frame and consisting of contiguous parallel circumferential series of links or meshes and interposed rigid connections, each link or mesh being engaged at opposite sides with contiguous links or meshes of the adjacent series, whereby the interlocking links or meshes are capable of relative sliding movement in parallel planes to allow the trap to be collapsed longitudinally, substantially as specified.

6. A fish-trap provided at intervals with throats each consisting of a ring connected to a trunco-conical partition, and jaws fulcrumed upon said ring and each consisting of a looped frame-bar having an arc-shaped free or rear end and forwardly-divergent side arms loosely connected to said ring and covered with flexible material, substantially as specified.

In testimony that we claim the foregoing as our own we have hereto affixed our signatures in the presence of two witnesses.

JOHN L. BROEKELMANN.
JOHN F. BUCKLER.

Witnesses:
FRANK A. HERMES,
WILLIAM NIGGEMYER.